May 5, 1959 — J. H. EBERLY — 2,885,232
COUPLING
Filed Feb. 5, 1958 — 2 Sheets-Sheet 1

INVENTOR
JOHN H. EBERLY
Joseph Allen Brown
ATTORNEY

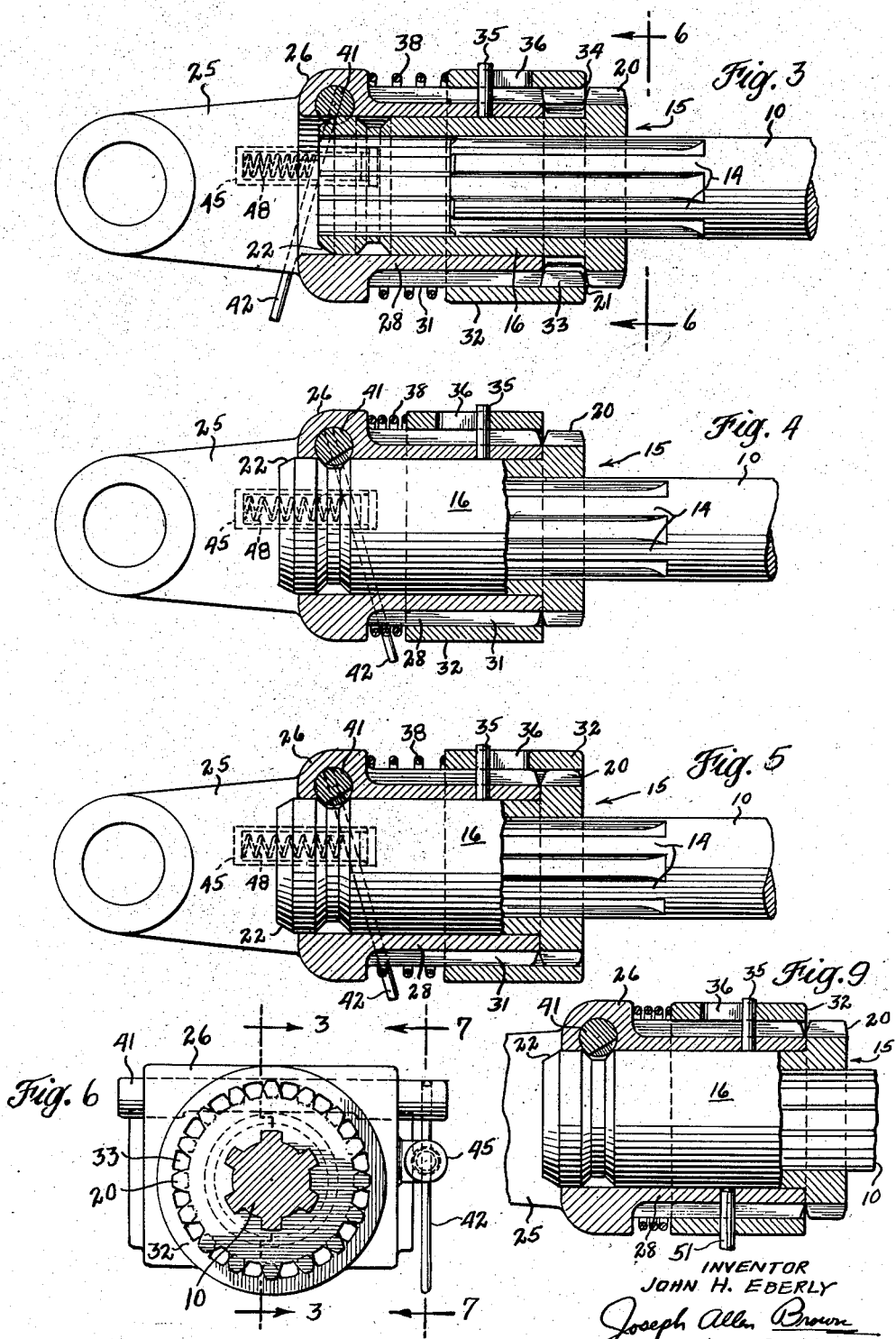

United States Patent Office 2,885,232
Patented May 5, 1959

2,885,232

COUPLING

John H. Eberly, Lancaster, Pa., assignor to Sperry Rand Corporation, New Holland, Pa., a corporation of Delaware Application February 5, 1958, Serial No. 713,381

14 Claims. (Cl. 287—53)

The present invention relates generally to the coupling of a sleeve to a rotatable drive shaft. More particularly, the invention relates to the coupling of a sleeve in a power-take-off assembly to a splined propeller shaft of a tractor.

Splined propeller shafts are provided on agricultural tractors and the like. Such shafts are driven by the engine of the tractor and may be rotated while the tractor is moving or stationary. When the tractor is moving, farm equipment such as a hay baler can be hitched to the tractor to be pulled thereby and connected to the propeller shaft of the tractor to be driven thereby. When the tractor is stationary, silo filling equipment or the like may be coupled to the tractor shaft for a source of power.

Generally, an implement's power-take-off assembly, hereafter called a p-t-o assembly, has a universal joint at one end for connection to a tractor propeller shaft. Conventionally, a yoke of such a universal joint is adapted for coupling to the tractor shaft. This yoke has an internally splined sleeve slidable over the splined propeller shaft, with the splines on the respective parts adapted to mesh so that when the tractor shaft is rotated the p-t-o is driven. Also, there is provided latching means for preventing longitudinal movement of the yoke sleeve on the shaft. U.S. Patent No. 2,696,089 shows in Fig. 3 a conventional type of latch means used for this purpose. A spring loaded lock pin carried on a universal yoke is adapted to project into a groove in the shaft, the pin being movable from operative to inoperative position by manually depressing it.

Heretofore, it has been a considerable problem connecting a p-t-o yoke to a propeller shaft. Frequently, when an operator tries to slide the yoke sleeve onto the propeller shaft he finds that the ends of the splines on the respective parts abut rather than mesh and the yoke will not slide onto the shaft. It is necessary, when this occurs, to rotate one part relative to the other to bring the splines on one part into alignment with the grooves in the other. Generally, the tractor shaft is manually rotatable only a very slight amount which may or may not be enough to bring about a meshing of the splined parts. The yoke sleeve is usually more readily rotatable. However, dust, dirt, crop material and other matter may tighten up the structure and make manual rotation difficult. The problem of rotating the yoke of a conventional p-t-o assembly is compounded by the fact that the operator must hold the latch device inoperative by pressing on the latch pin with his thumb as he manipulates the yoke. Even when the p-t-o yoke is readily rotatable, the operator may turn the yoke too much or too little to prevent sliding it upon the tractor shaft. Much time has been wasted up to the present in connecting p-t-o assemblies to propeller shafts, in addition, general annoyance has resulted from the problem.

One object of this invention is to provide an improved device for coupling the yoke of a universal joint in a p-t-o assembly to a tractor propeller shaft.

Another object of this invention is to provide in such device means whereby when the p-t-o yoke is slid onto the tractor propeller shaft the yoke is automatically locked against longitudinal movement relative to the shaft.

Another object of this invention is to provide, in a coupling of the character described, means for connecting the parts whereby when the tractor propeller shaft is rotated the p-t-o assembly is driven.

A further object of this invention is to provide a coupling of the character described wherein the p-t-o yoke may be connected to the tractor shaft in a matter of seconds under all conditions.

A still further object of this invention is to provide in a coupling of the character described means whereby the yoke of a p-t-o can be readily connected to different types of propeller shafts.

Other objects of this invention will be apparent hereinafter from the specification and from the recital in the appended claims.

In the drawings:

Fig. 3 is a part side elevation, part section of applicant's device and showing the yoke as it is slid onto the propeller shaft and just before it is locked in place;

Fig. 4 is a view similar to Fig. 3 showing the yoke locked against longitudinal movement relative to the shaft, but before it is connected thereto for rotatable movement;

Fig. 5 shows the yoke in full coupled relationship to the tractor shaft;

Fig. 6 is a section taken on the line 6—6 of Fig. 3 and looking in the direction of the arrows;

Fig. 9 is a fragmentary view similar to Fig. 4 and showing another embodiment of the present invention.

Figure 1:
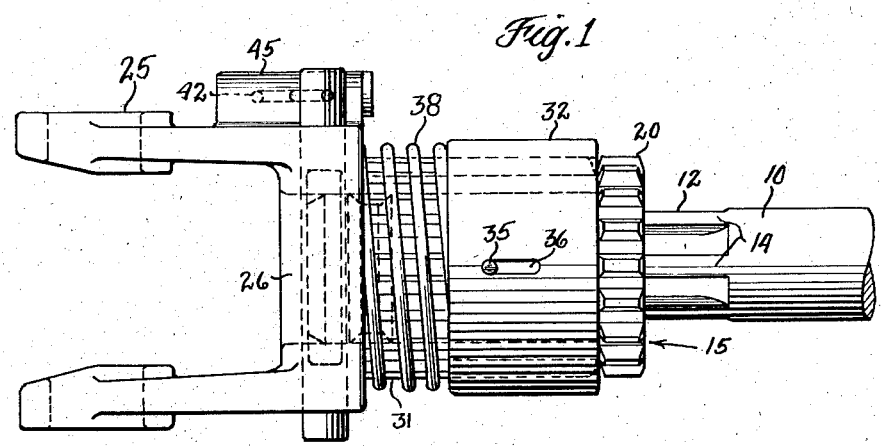
Fig. 1 is a side elevation of a tractor propeller shaft and the yoke of a universal joint of a p-t-o assembly, there being shown a device constructed according to this invention for connecting the yoke to the shaft.
Figure 2:
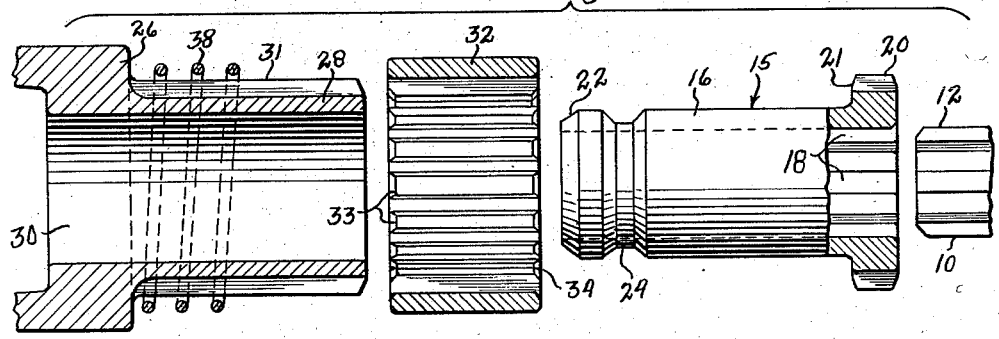
Fig. 2 is an exploded fragmentary, part side elevation, part vertical section of the parts shown in Fig. 1.

Referring now to the drawings by numerals of reference, 10 denotes a propeller shaft of a tractor, such shaft being adapted to be rotated through suitable connection not shown to the tractor engine. Shaft 10 has an outer end 12 splined at 14.

Mountable on shaft 10 is an adapter 15 in the form of a tubular member or cylinder 16 having internal splines 18 which mesh with the splines 14. When the adapter 15 is mounted on shaft 10, any suitable means may be employed for preventing the adapter from coming off the shaft. For example, the bore of the adapter may be provided with a taper whereby the adapter can be pressed onto the propeller shaft.

The inner end of adapter 15 has a radially projecting external spline section 20. Each spline of the section has a forward end 21. The outer end of adapter 16 is beveled at 22; and, spaced inwardly from this bevel is an annular groove 24.

Slidable onto adapter 15 is a yoke 25 of a universal joint of the type found at one end of a p-t-o assembly. Yoke 25 has a body 26 of one outside diameter and a sleeve 28 of reduced outside diameter. The bore 30 of both the body and the sleeve is such as to appropriately receive the adapter. Such bore is cylindrical and smooth, as is the periphery of adapter 15 up to the splined section 20.

Sleeve 28 has external splines 31. Slidable on the sleeve is a collar 32 having internal splines 33 which mesh with the spines 31. The splines 33 are adapted also to mesh with the external splines 20 on adapter 15. Each spline 33 has an end 34 facing toward adapter 15.

Longitudinal movement of collar 32 on spline 28 is restricted by a pin 35 projecting radially from the sleeve and through an elongate longitudinal slot 36 in the collar. Interposed between collar 32 and the body 26 of yoke 25 is a coiled spring 38 which encircles the periphery of sleeve 28. Spring 38 constantly urges collar 32 toward the right of Fig. 1, the collar being restrained by the disposition of pin 35 in one end of slot 36. In normal position (Figs. 3 and 5), a portion of the collar projects beyond the adjacent end of sleeve 28. However, it will be apparent that while collar 32 is limited in its movement away from head 26 of the yoke, it may move toward the head or to the left of Fig. 1 against the resistance of spring 38 (Fig. 4).

Figure 7:
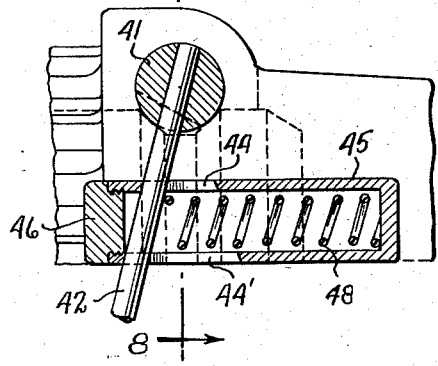
Fig. 7 is a fragmentary section taken on the line 7—7 of Fig. 6 and looking in the direction of the arrows.
Figure 8:
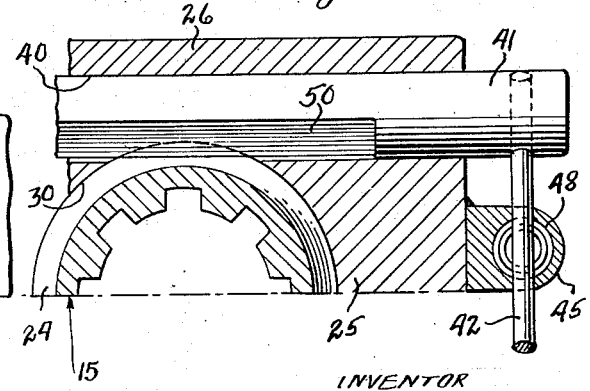
Fig. 8 is a fragmentary section taken on the line 8—8 of Fig. 7 and looking in the direction of the arrows.

The head 26 of yoke 15 has a transverse cylindrical bore 40 communicating with the bore 30. Rotatably mounted in bore 40 is a lock pin 41 which extends all the way through head 26 and projects laterally on opposite sides thereof. One laterally projecting end of the pin has a handle 42 extending diametrically through it. Handle 42 projects radially of the pin and through spaced slots 44—44' (Fig. 7) in a container 45 welded to the side of the yoke. The container is closed at one end by a cap 46. Housed in the container is a spring 48 which engages handle 42 pivoting it toward the ends of slots 44—44' adjacent cap 46. The handle is movable counterclockwise from the position shown in Fig. 7 against the resistance of spring 48. The rotatable position of handle 42 determines the rotatable position of lock pin 41. The projection of handle 42 through the slots 44—44' prevents pin 41 from moving axially in bore 40.

Lock pin 41 is cylindrical, having however a cutaway portion between its two ends to provide a land 50 projectable into bore 30 depending upon the rotatable position of the lock pin. In one rotatable position, Fig. 3, pin 41 is whooly outside of bore 30.

*Operation*

When an operator wishes to connect the yoke 25 to the propeller shaft 10, he first slides the adapter 15 onto the shaft. When the adapter is in place and frictionally or otherwise connected to the shaft so that it will not slide off, the operator takes the yoke 25 and slides it onto the adapter. Tubular member 16 of the adapter readily fits into the bore 30 of the sleeve 28 of the yoke. The rotatable position of the yoke is immaterial. As the yoke 25 is slide longitudinally toward shaft 10, the beveled outer end 22 of the adapter engages the land 50 of latch pin 41 causing the pin to rotate clockwise (Fig. 3) against the resistance of spring 48, wherein the pin moves out of bore 30. When the yoke has been slid onto the adapter to the position shown in Fig. 4, the pin 41 will come into register with annular groove 24. Then the pin will be rotated by the spring 48 back to its normal position wherein it again projects into bore 30. In this position (Fig. 4) the yoke is latched and prevented from moving longitudinally relative to the adapter.

As the yoke 25 is slid onto the adapter, the splines 33 on collar 32 may be so disposed as to come into mesh with the splines 20 on the adapter. In such event, once latch pin 41 drops into groove 24, the coupling of the parts is completed. However, in the event that the rotatable position of the yoke is such that the splines on the collar and adapter do not come into mesh, the ends 34 of the collar splines will come into abutting relationship with the ends 21 of the adapter splines. Longitudinal movement of the yoke onto the adapter until the yoke is latched will result in a shifting of the collar 32 from the position shown in Fig. 3 to the position shown in Fig. 4, compressing coil spring 38.

When the parts are as shown in Fig. 4, the yoke may not move longitudinally relative to the adapter. However, the sleeve 28 and adapter 15 may rotate relative to each other. If the operator gives the yoke a slight twist relative to the adapter, the splines on the collar will come into register with the grooves on the adapter and spring 38 will become effective to shift the collar 32 toward the right or to the position shown in Fig. 5. It will thus be seen that, thereafter when shaft 10 is rotated, the adapter 15, through its splined connection with the collar 32, will drive the collar, and the collar in turn will drive the yoke through its splined connection with sleeve 28. Thus, power will be transmitted from the propeller shaft through the p-t-o assembly.

If desired, when the operator latches the yoke to the propeller shaft and if the parts come together as shown in Fig. 4, he may if he so desires leave the parts that way and climb onto the tractor and start the propeller shaft. When the shaft 10 commences to rotate, it will move relative to the yoke 25. A few degrees of such movement will cause the splines on the adapter to come into register with the splines on the collar 32 whereupon the collar will shift axially under the action of the spring 38 and over the splined section of the adapter, thereby completing the coupling.

To disconnect yoke 25 from the shaft 10, the operator merely has to grasp the handle 42 and pivot the pin 41 to the position shown in Fig. 3 and slide the yoke 25 off.

With applicant's invention the problem of attempting to align splines on a p-t-o yoke with splines of a propeller shaft of the tractor is eliminated. The considerable problem of connecting p-t-o assemblies to propeller shafts is now rendered extremely simple. A connection may be made under all conditions in a matter of seconds whereas considerable time was required heretofore.

Further, the device described may be employed in connecting a yoke to a plurality of types and sizes of propeller shafts. All that is necessary is that an adapter be used suitable for connection with the shaft encountered.

Referring now to Fig. 9, parts in this figure similar to parts shown in the previous figures bear like numerals. Applicant has provided a pin 51 projectable through a suitable hole in collar 32 and into a hole in sleeve 38 to latch the collar in a position wherein spring 38 is compressed. When so latched, the operator may slide the yoke onto adapter 15 with no resistance from spring 38, which occurs when the splines on the collar come against the splines on the adapter. Easier handling of the yoke is thus rendered possible. Once the yoke is connected to the adapter by pin 41, the operator pulls pin 51, whereby the collar will slide over the adapter splines. If the splines abut instead of mesh, the operator merely twists the yoke or starts the tractor and thereby completes the connection.

While this invention has been described in connection with a particular embodiment thereof and an addition thereto, it will be understood that it is capable of further modification, and this application is intended to cover any variations, uses or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for coupling a sleeve to a rotatable shaft, comprising an adapter mountable on said shaft and rotatable therewith, said sleeve being slidable onto said adapter, means for automatically locking said sleeve against longitudinal movement on said adapter, and means for connecting said sleeve to said adapter whereby when the adapter and shaft rotate the sleeve rotates.

2. A device for coupling a sleeve to a rotatable shaft, comprising an adapter mountable on said shaft and rotatable therewith, said sleeve being slidable onto said adapter, means responsive to such sliding of said sleeve for automatically locking the sleeve against longitudinal movement on the adapter, and means responsive to the rotatable position of said sleeve and adapter relative to each other for bringing about a connection of the sleeve and adapter whereby when the adapter and shaft rotate the sleeve rotates.

3. A device for coupling a sleeve to a rotatable, splined shaft, comprising an internally splined tubular adapter mountable on said shaft with the splines of the respective parts intermeshing to provide a driving connection therebetween, said sleeve being slidable onto said adapter, means responsive to such sliding for automatically locking the sleeve against longitudinal movement on the adapter while allowing rotatable movement, and means responsive to the rotatable position of said sleeve and adapter relative to each other for bringing about a connection of the sleeve and adapter whereby when the shaft and adapter rotate said sleeve rotates.

4. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner and an outer end, said inner end having radially projecting splines, said sleeve being slidable onto said adapter, means responsive to such sliding for automatically locking the sleeve against longitudinal movement on the adapter, and means responsive to the rotatable position of said sleeve and adapter relative to each other for bringing about a connection of the external splines on the sleeve and adapter whereby when the shaft and adapter rotate said sleeve rotates.

5. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner and an outer end, said inner end having radially projecting splines and said outer end an annular peripheral groove, a spring loaded latch pin carried on said sleeve and adapted to fit into said groove, said sleeve being slidable onto said adapter, said latch pin projecting into said adapter groove when said sleeve has been moved to a given longitudinal position on the adapter, and means responsive to the rotatable position of said sleeve and adapter relative to each other for connecting the external splines on the sleeve and adapter whereby when the shaft and adapter rotate said sleeve rotates.

6. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner and an outer end, said inner end having radially projecting splines, said sleeve being slidable onto said adapter, means responsive to such sliding for automatically locking the sleeve against longitudinal movement on the adapter, and means responsive to the rotatable position of said sleeve and adapter relative to each other for connecting the external splines on the sleeve and adapter whereby when the shaft and adapter rotate said sleeve rotates, said last named means comprising an internally splined collar mounted on said sleeve and slidable longitudinally relative thereto, the splines on said collar meshing with the splines on said sleeve and being adapted to mesh with the splines on said adapter, said collar normally projecting beyond one end of said sleeve and toward said adapter inner end, and spring means resisting movement of said collar away from said projecting position.

7. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner and an outer end, said inner end having radially projecting splines and said outer end an annular peripheral groove, a spring loaded latch pin carried on said sleeve and adapted to fit into said groove, said sleeve being slidable onto said adapter, said latch pin projecting into said adapter groove when said sleeve has been moved to a given longitudinal position on the adapter, and means responsive to the rotatable position of said sleeve and adapter relative to each other for connecting the external splines on the sleeve and adapter whereby when the shaft and adapter rotate said sleeve rotates, said last named means comprising an internally splined collar mounted on said sleeve and slidable longitudinally relative thereto, the splines on said collar meshing with the splines on said sleeve and being adapted to mesh with the splines on said adapter when the sleeve is on the adapter and latched thereto, said collar normally projecting beyond one end of said sleeve and toward said adapter inner end, and spring means resisting movement of said collar away from said projecting position.

8. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner and an outer end, said inner end having radially projecting splines and said outer end an annular peripheral groove, a spring loaded latch pin carried on said sleeve and adapted to fit into said groove, said sleeve being slidable onto said adapter, said latch pin projecting into said adapter groove when said sleeve has been moved to a given longitudinal position on the adapter, and means responsive to the rotatable position of said sleeve and adapter relative to each other for connecting the external splines on the sleeve and adapter whereby when the shaft and adapter rotate said sleeve rotates, said last named means comprising an internally splined collar mounted on said sleeve and slidable longitudinally relative thereto, means for limiting the sliding of said collar, the splines on said collar meshing with the splines on said sleeve and being adapted to mesh with the splines on said adapter when the sleeve is on the adapter and latched thereto, said collar normally projecting beyond one end of said sleeve and toward said adapter inner end, and a coil spring surrounding said sleeve and engaging said collar, said spring resisting movement of said collar away from said projecting position.

9. A device for coupling a sleeve to a rotatable shaft, comprising a tubular adapter mountable on said shaft and rotatable therewith, said adapter having an inner end and an outer end, said inner end having radially projecting splines, said sleeve being slidable onto said adapter over said outer end, a collar slidable longitudinally on said sleeve, said collar being internally and said sleeve externally splined to provide a connection therebetween, the splines on said collar being adapted to mesh with the splines on said adapter, resilient means urging said collar toward said adapter splines and beyond one end of said sleeve, means for latching said sleeve against longitudinal movement on said adapter when the sleeve has been slid to a predetermined point thereon, and the respective lengths of said adapter and sleeve and the projection of said collar being such that the splines on the collar are engageable with the splines on the adapter when said sleeve is latched to the adapter.

10. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner end and an outer end, said inner end having radially projecting splines, said sleeve being slidable onto said adapter, means responsive to such sliding for automatically locking the sleeve against longitudinal movement on the adapter when the sleeve is in a given position on the adapter, an internally splined collar mounted on said sleeve and slidable longitudinally relative thereto, the splines on said collar meshing with the splines on said sleeve and being adapted to mesh with the splines on said adapter when the sleeve is on the adapter and latched thereto, said collar normally projecting beyond one end of said sleeve and toward said adapter inner end, a spring resisting movement of said collar away from said projecting position, and means for releasably latching said collar to said sleeve when said collar has been moved from said projecting position and against the resistance of said spring.

11. A device for coupling a sleeve having a cylindrical bore and a splined periphery to a rotatable, splined shaft, comprising an internally splined tubular adapter mountable on said shaft with the splines on the respective parts intermeshing to provide a driving connection therebetween, said adapter having an inner end and an outer end, said inner end having radially projecting splines, said sleeve being slidable onto said adapter, means responsive to such sliding for automatically locking the sleeve against longitudinal movement on the adapter, an internally splined collar mounted on said sleeve and slidable longitudinally relative thereto, the splines on said collar meshing with the splines on said sleeve and being adapted to mesh with the splines on said adapter when the sleeve is on the adapter and latched thereto, said collar normally projecting beyond one end of said sleeve and toward said adapter inner end, a spring resisting movement of said collar away from said projecting position, and means for releasably latching said collar to said sleeve when said collar has been moved from said projecting position and against the resistance of said spring, said last named means comprising a pin manually projectable through registrable holes in said collar and sleeve.

12. A device for latching a sleeve against longitudinal movement on a cylinder onto which the sleeve is slidable, wherein said cylinder has an annular groove in its periphery, comprising a latch pin adapted to fit into said groove, means supporting said pin on said sleeve for rotatable movement about an axis transverse to the axis of the sleeve, said pin being so supported and the configuration of the pin being such that in one rotatable position the pin projects into the bore of the sleeve and in a second rotatable position is disposed outside of said bore, means resiliently holding said pin in said one rotatable position, said cylinder engaging said pin when said sleeve is slid onto the cylinder and rotating the pin from said one rotatable position to said second rotatable position, and the pin returning to said one position when in register with said annular groove.

13. A device for latching a sleeve aaginst longitudinal movement on a cylinder onto which the sleeve is slidable, wherein said cylinder has an annular groove in its periphery, comprising a latch pin adapted to fit into said groove, means supporting said pin on said sleeve for rotatable movement about an axis transverse to the axis of the sleeve, said pin being so supported and the configuration of the pin being such that in one rotatable position the pin projects into the bore of the sleeve and in a second rotatable position is disposed outside of said bore, said pin having a portion projecting laterally of said sleeve, a handle connected to said projecting portion, means resiliently urging said pin to said one rotatable position, said cylinder engaging said pin when said sleeve is slid onto the cylinder and rotating the pin from said one rotatable position to said second rotatable position, the pin returning from said second position to said one position when in register with said annular groove.

14. A device for latching a sleeve against longitudinal movement on a cylinder onto which the sleeve is slidable, wherein said cylinder has an annular groove in its periphery, comprising a latch pin adapted to fit into said groove, means supporting said pin on said sleeve for rotatable movement about an axis transverse to the axis of the sleeve, said pin being so supported and the configuration of the pin being such that in one rotatable position the pin projects into the bore of the sleeve and in a second rotatable position is disposed outside of said bore, said pin having a portion projecting laterally of said sleeve, a handle connected to said projecting portion, means resiliently urging said pin to said one position, said cylinder engaging said pin when said sleeve is slid onto the cylinder and rotating the pin from said one rotatable position to said second rotatable position, the pin returning from said second position to said one position when in register with said annular groove, and means for preventing axial movement of said pin and for limiting the rotatable movement thereof.

References Cited in the file of this patent

UNITED STATES PATENTS

| | | |
|---|---|---|
| 2,397,905 | Acton et al. | Apr. 9, 1946 |
| 2,448,278 | Ronning | Aug. 31, 1948 |
| 2,639,160 | Studebaker et al. | May 19, 1953 |